US007002742B2

(12) United States Patent
Imaizumi et al.

(10) Patent No.: US 7,002,742 B2
(45) Date of Patent: Feb. 21, 2006

(54) POLARIZING FUNCTION ELEMENT, OPTICAL ISOLATOR, LASER DIODE MODULE AND METHOD OF PRODUCING POLARIZING FUNCTION ELEMENT

(75) Inventors: Nobuo Imaizumi, Adachi-ku (JP); Kenichi Shiroki, Adachi-ku (JP); Yoshihito Kasai, Adachi-ku (JP); Toshimichi Sato, Adachi-ku (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/130,474

(22) PCT Filed: Sep. 19, 2001

(86) PCT No.: PCT/JP01/08152

§ 371 (c)(1), (2), (4) Date: May 20, 2002

(87) PCT Pub. No.: WO02/25325

PCT Pub. Date: Mar. 28, 2002

(65) Prior Publication Data

US 2003/0007251 A1 Jan. 9, 2003

(51) Int. Cl.
*G02B 5/30* (2006.01)

(52) U.S. Cl. ........................ 359/486; 359/485; 359/900

(58) Field of Classification Search ................ 359/486, 359/483, 485, 900
See application file for complete search history.

(56) References Cited

U.S. PATENT DOCUMENTS 4,241,109 A * 12/1980 Johnson ...................... 427/162
4,289,381 A * 9/1981 Garvin et al. ............ 427/163.1
4,321,282 A * 3/1982 Johnson ....................... 216/59
4,436,363 A * 3/1984 Steinbruegge et al. ...... 359/359
5,245,471 A 9/1993 Iwatsuka et al.
5,748,368 A * 5/1998 Tamada et al. ............. 359/486
5,757,538 A * 5/1998 Siroki ........................ 359/282
5,991,075 A 11/1999 Katsuragawa et al.
6,055,102 A * 4/2000 Park ........................... 359/484
6,532,111 B1 * 3/2003 Kurtz et al. ................ 359/486
2002/0191880 A1 * 12/2002 Borrelli et al. ............... 385/11

FOREIGN PATENT DOCUMENTS

EP 999459 A2 5/2000
JP 60-97304 A 5/1985
JP 60-230102 A * 11/1985

(Continued)

OTHER PUBLICATIONS

PTO 02-4069, "Infrared Wire Grating Polarizer for Vapor Deposition in Both Directions and Its Manufacture", English-language translation of JP 60-230102A, FLS, Inc. transl., U.S. Patent and Trademark Office, Aug. 2002.*

*Primary Examiner*—John Juba, Jr.
(74) *Attorney, Agent, or Firm*—Nixon Peabody LLP; Donald R. Studebaker

(57) ABSTRACT

This invention has the polarizing function of polarizing an input beam and a non-reflecting function of suppressing reflection of the input beam, wherein at least one side of a light-transmissive substrate 1 has a polarizing portion 4 with a striped structure formed by multiple alternating light-transmissive dielectric layers 2*a*, 2*b* . . . and metallic film layers 3*a*, 3*b* . . . . Its characteristics are improved if the metallic film layers are very thin and flat, with a target thickness in the range from 5 to 20 nm and variation of film thickness within the range of ±10%.

19 Claims, 6 Drawing Sheets

FOREIGN PATENT DOCUMENTS

| | | | |
|---|---|---|---|
| JP | 3-188412 | A | 8/1991 |
| JP | 4-256904 | A | 9/1992 |
| JP | 7-49468 | A | 2/1995 |
| JP | 10-153706 | A | 6/1998 |
| JP | 10-207396 | A | 8/1998 |
| JP | 11-14814 | A | 1/1999 |
| JP | 11-23845 | A | 1/1999 |
| JP | 2000-249834 | A | 9/2000 |
| JP | 2000-284117 | A | 10/2000 |

* cited by examiner

POLARIZING FUNCTION ELEMENT, OPTICAL ISOLATOR, LASER DIODE MODULE AND METHOD OF PRODUCING POLARIZING FUNCTION ELEMENT

FIELD OF INDUSTRIAL USE

This invention concerns a polarizing function element, an optical isolator and a laser diode module. It also concerns a method of producing the polarizing function element.

PRIOR ART

An optical isolator normally has as its constituent parts, at the least, a Faraday rotator, polarizers on the beam input and output sides, and a magnet to provide a parallel magnetic field in the direction of the beam axis. In this constitution, a polarizing prism or polarizing glass is used as the polarizer. The polarizer must be interposed between the input or output side and the Faraday rotator and the relative angles must be determined precisely; this requires labor in assembly and raises the product cost of the optical isolator. Moreover, the need for two polarizers, on both the input side and the output side of the Faraday rotator, limits the possibility of miniaturization.

Polarizing function elements of various construction have been proposed to reduce the cost of the optical isolator and to aid miniaturization. In one of these, the polarizing function element has a striped structure caused by stacking alternating layers of light-transmissive dielectric lattice and metallic film (JPO Kokai Patent Report S60-97304 of 1985). If the input beam enters this polarizing function element from a direction perpendicular to direction of stacking, the component parallel to the layers is absorbed and the component perpendicular to the layers passes through, thus providing for this polarizing function element with the polarization effect.

Moreover, it has been proposed that an optomagnetic crystal having the Faraday effect (hereafter a "Faraday rotator") be used as a substrate. An example of this is a Faraday rotator constituted with an electrically conductive metallic lattice on each side of the Faraday rotator as a polarizing layer slanted at an angle of 45° to the optical axis (JPO Kokai Patent Report H7-49468 of 1995). Another proposal is to put multiple parallel grooves of a given width and depth on the surface of a substrate and fill the grooves in the substrate with a metallic layer to constitute a polarization element integrated with a Faraday rotator (JPO Patent 3067026).

A further proposal is to create for long, thin, fine grooves and ridges on the surface of quartz substrate, a thin semiconductor film over the full groove and ridge surface, then remove the semiconductor film from the tops of the ridges and bottoms of the grooves while leaving it on the side walls. By fixing a transparent substance with the same degree index of refraction as the quartz substrate from the inside of the grooves to the surface it is possible to form a striped polarizing film with alternating strips of quartz and semiconductor film, integrated with the substrate (JPO Kokai Patent Report H4-256904 of 1992).

There are, however, problems in the manufacture or in the properties of these elements with a polarization function.

Because the stacked structure of light-transmissive dielectric layer lattice and metallic film is simply a multiple alternation of materials, the stack is liable to separate at the metallic film if the film is made extremely thin to prevent reflective scattering of the input beam. Because there are limits to the number of layers that can be stacked, in view of the separation at the metallic film, there are corresponding limits to the thickness in the direction of stacking, and so it is not possible to input a beam with a large beam diameter.

In a structure with a metallic lattice on both sides of a Faraday rotator, the method of mass production is to form the metallic lattice by vacuum deposition on a Faraday rotator measuring several square centimeters, and then cut it into squares measuring 1 mm to 3 mm.

When the Faraday rotator is cut, damages or impurities can occur easily in the polarizing film because of irregularities in the intervals between metallic lattice segments, and so it is necessary to pay close attention in machining, washing and other processes. Moreover, because of irregularities on the polarizing surface, adding another optical layer to make up a non-reflecting film is difficult because of gaps in the intervals between metallic lattice segments.

In the structure having grooves in the surface of the Faraday rotator, it is necessary to make numerous fine, parallel grooves of a fixed width and a depth that exceeds the width in the surface of a hard optomagnetic crystal such as garnet, a process that is actually very difficult. It is also difficult to control with high precision the process of accurately cutting the fine grooves down to a fixed depth and filling the grooves with a metallic layer.

In the striped structure with an alternating distribution of quartz and thin semiconductor layers, the manufacturing process first uses high-frequency sputtering to form thin semiconductor layers into a full surface of grooves and ridges. This full-surface film is difficult to apply to the sides of the grooves and ridges with uniform thickness, and so it is difficult to control precisely the side-surface layers that are used as the polarizing film. When the film is a thick one, especially, performance declines because of great beam losses due to reflective scattering of the input beam. In addition to that, the semiconductor material is relatively expensive, and so the manufacturing cost is increased.

This invention has the purpose of providing a polarizing function element that can be cut and washed easily, that has high precision and excellent light-transmissivity and polarization performance, and that is inexpensive and compact, formed on a substrate of multiple parallel layers of metallic film with intervals between.

This invention has the additional purpose of providing an optical isolator together with a polarization element with superior characteristics in terms of light-transmissivity and polarization, having a polarization portion that suppresses reflective scattering of the input beam and thus prevents optical losses.

A further purpose of this invention is to provide a laser diode module with oscillation power that is large relative to the electrical input, and that is stable.

Another purpose of this invention is to provide a method of manufacturing a polarizing function element that has a very thin metallic film layer that suppresses reflective scattering of the input beam and thus prevents optical losses, and that has superior light-transmissivity and polarization characteristics and can be manufactured simply and inexpensively.

DESCRIPTION OF INVENTION

This invention has a polarizing portion with a striped structure formed by multiple alternating light-transmissive dielectric layers and metallic film layers, which has both the polarizing function of polarizing an input beam and a non-reflecting function of suppressing reflection of the input beam, and is formed at least on one side of a light-transmissive substrate. By integrating the polarizing portion, as the polarizing and non-reflective film, with the light transmissive substrate in this way, it is possible to have the polarizing and non-reflective film and the substrate in a strong, integrated structure, and to have superior performance including light-transmissivity and polarization.

It is also possible to improve the performance as a polarizing function element and increase the polarization/extinction ratio by forming a polarizing portion or stacked portion on both sides of the light-transmissive substrate.

It is preferable that the metallic film layers be very thin and flat, having a target film thickness within the range from 5 to 20 nm and variation of film thickness within the range of ±10%. By constituting the metallic film layers in this way, it is possible to suppress reflective scattering of the input beam by the metallic film layers and maintain low TM loss and high TE loss.

The stacked portion, which stacks the polarizing portion with light-transmissive dielectric layers can have one or more stack portions. By stacking light-transmissive dielectric layers in this way, it is possible to improve the function of preventing reflection.

With this invention, it is possible to use a Faraday rotator as the light-transmissive substrate. With such a constitution, it is possible to form a Faraday rotator integrated with a polarization element that has low light loss and excellent performance.

It is also possible to have an optical isolator that incorporates a polarization element with a Faraday rotator as the light-transmissive substrate, and a laser diode module in which such an isolator is mounted. This optical isolator has high performance and excellent characteristics, and the laser diode module in which such an isolator is mounted will have a greater oscillation power for the same electrical input.

This invention includes a method of manufacturing a polarizing function element, in which there is a light-transmissive substrate, and after a base layer is formed on the substrate for the formation of a light-transmissive dielectric layer, multiple parallel parts of a base lattice are formed of a dielectric layer separated by a given interval, a metallic film layer is formed by vapor deposition at an angle on one sides of the base lattice, a light-transmissive dielectric layers are formed by filling the residual intervals between the metallic firm and base lattice with dielectric material, yielding a polarizing portion with a striped structure of the dielectric layers and the metallic film layers integrated with the substrate.

Producing the metallic film layer by vapor deposition at an angle makes it possible to manufacture metallic film layers that are very thin and flat both simply and easily A method of manufacturing in which the metallic film layer is deposited on both sides of the base lattice at angles that are different on each side of the base lattice is also possible. Using this it is possible to produce the polarizing portion simply and with good efficiency.

A method of manufacturing in which a polarizing portion with a striped structure of dielectric layers and metallic film layers, which are very thin and flat having a target film thickness within the range from 5 to 20 nm and variation of film thickness within the range of ±10%, integrated with the substrate, is also possible. By using this method, it is possible to suppress reflective scattering of the input beam by the metallic film layers and maintain low TM loss and high TE loss.

OPTIMUM MODE OF IMPLEMENTATION

One mode of implementation of the polarizing function of this invention is explained below with reference to the drawings.

Figure 1:
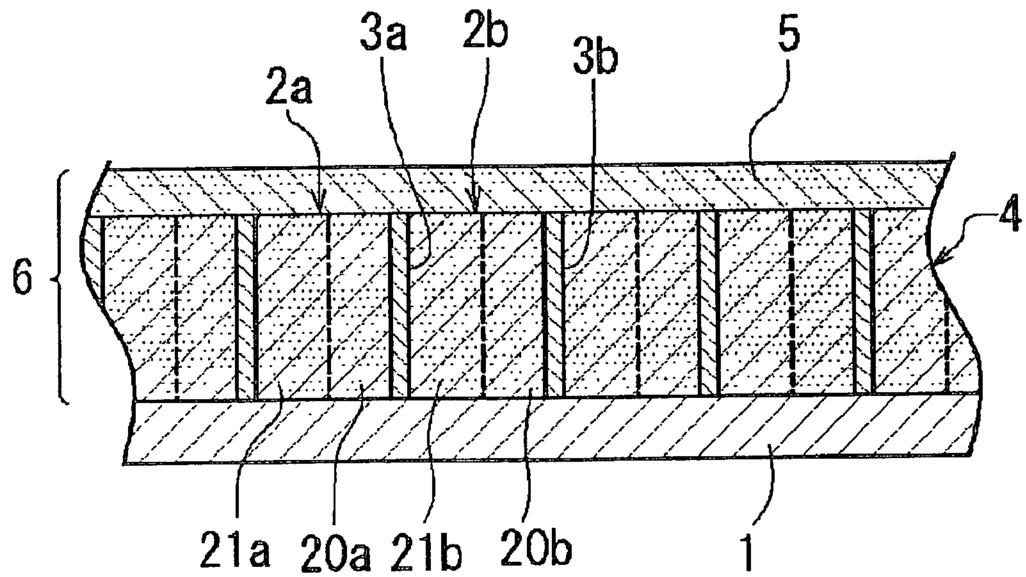
FIG. 1 is an explanatory drawing showing the polarizing function element of one mode of implementation of this invention.

The polarizing function element of this invention, as shown in FIG. 1, has a light-transmissive substrate 1 on which there is a flat polarizing portion 4 that comprises multiple, parallel metallic film layers 3*a*, 3*b* . . . and light-transmissive dielectric layers 2*a*, 2*b* . . . that fill in the intervals between the metallic film layers 3*a*, 3*b* . . . . This polarizing portion 4 has the function of polarizing the input beam and also the function of a non-reflective film that suppresses reflection of the input beam.

As a concrete example of the polarizing function element, there is a light-transmissive substrate 1 of silicon (Si), with metallic film layers 3*a*, 3*b* . . . of tantalum (Ta) and dielectric layers 2*a*, 2*b* . . . of silicon dioxide ($SiO_2$) to fill in the intervals between the metallic film layers 3*a*, 3*b* . . . , which make up the flat polarizing portion 4 as a film with a polarizing function and a non-reflective function (hereafter "polarizing/non-reflective film").

In this case the thickness of the metallic film layers 3*a*, 3*b* . . . is 45 nm, and the thickness of the silicon dioxide dielectric layer 2*a*, 2*b* . . . is 55 nm, in which case the index of refraction is 1.87 for a beam with a wavelength of 1.55 μm. When the polarizing portion 4 is formed with a thickness of 390 nm, it functions effectively as a polarizing/non-reflective film.

The polarizing function element constituted in this way has, as a polarizing/non-reflective film, a polarizing portion 4 that is dielectric layers 2*a*, 2*b*, . . . filling in the intervals between multiple, parallel metallic film layers 3*a*, 3*b* . . . , and so elements can easily be made with high precision by cutting, washing and other processes. The flat polarizing portion 4 that functions as the polarizing/non-reflective film is integrated with the light-transmissive substrate 1, and so is inexpensive and compact.

In this polarizing function element, moreover, it is possible to add a separate light-transmissive dielectric layer 6 to the polarizing portion 4 on the light-transmissive substrate 1, thus creating a stacked portion 6 which has non-reflective function.

As a concrete example, there is a light-transmissive substrate 1 of transparent glass (material: BK-7 glass), with the polarizing portion 4 composed of metallic film layers 3*a*, 3*b* . . . of aluminum (Al) and dielectric layers 2*a*, 2*b* . . . of silicon dioxide ($SiO_2$) to fill in the intervals between the metallic film layers 3*a*, 3*b* . . . , the polarizing portion 4 being overlaid with a dielectric layer 5 of silicon dioxide ($SiO_2$) to form a stacked film as the polarizing/non-reflective film.

In this case, when the wavelength in question is 1.55 $\mu$m, it is effective to have an aluminum metallic film layer 3*a*, 3*b* . . . thickness of 50 nm, a silicon dioxide dielectric layer 2*a*, 2*b* . . . thickness of 50 nm, a polarizing portion 4 thickness of 388 nm and a silicon dioxide dielectric layer 5 thickness of 388 nm. A glass substrate 1 index of refraction of 1.51, polarizing portion 4 index of refraction of 1.82 and dielectric layer 5 index of refraction of 1.46 can form a polarization/extinction ratio of 30 dB.

In a polarizing function element constituted in this way, the stacked non-reflective portion 6 that comprises the polarizing portion 4 and the light-transmissive dielectric layer 5 functions as a polarizing/non-reflective film. Accordingly, adding a light-transmissive dielectric layer 5 to the polarizing portion 4 improves the characteristics of light-transmissivity and polarization, because reflective scattering of the input beam is suppressed and light loss is reliably prevented. A high-precision product that can be cut and washed easily can be formed, and it can be inexpensive and compact.

Figure 2:
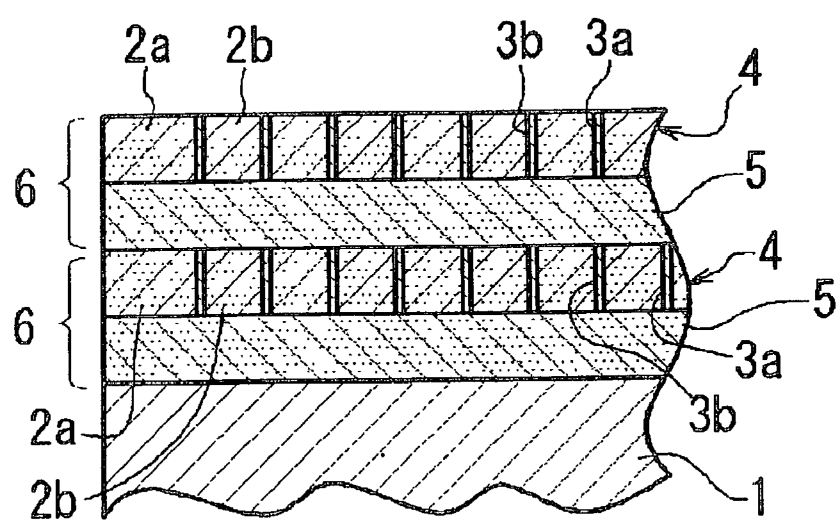
FIG. 2 is an explanatory drawing showing another mode of implementation of this invention.

Now, in the mode of implementation described above the dielectric layer 5 was described as overlapping the polarizing portion 4, but as shown in FIG. 2 it is possible to arrange the structure in the order of light-transmissive substrate 1, dielectric layer 5 and polarizing portion 4. Further, it is possible for the stacked non-reflective portion 6 to have multiple layers 6-1 and 6-2, with dielectric layers 5 alternating with polarizing portions 4.

In this concrete example, a silicon substrate 1 is used as the light-transmissive substrate; the layer next to the silicon substrate 1 is silicon dioxide about 24 nm thick as the first dielectric layer 5, a first polarizing portion 4 is about 218 nm thick, a second dielectric layer (silicon dioxide) 5 is about 212 nm thick, and a second polarizing portion 4 is about 279 nm thick. The dielectric layer that makes up the polarizing portion 4 is silicon dioxide, and silver is used as the metallic film layer.

The performance and effects described above can be achieved using that arrangement.

The performance of the polarizing function elements described above can be improved if the metallic film layers 3*a*, 3*b* . . . are very thin and flat, having a target film thickness within the range from 5 to 20 nm and variation of film thickness within the range of ±10%.

That is, when this polarizing function element is packaged, it is assembled so that the optical plane is perpendicular to the beam axis, or at an angle of about 8°. If the film thickness of the metallic film layer 3*a*, 3*b* . . . is 5 nm±10% or less, the perpendicular input beam will have low TE loss, reducing its function as a polarizer. On the other hand, at an angle of 8° with the film thickness of the metallic film layer 3*a*, 3*b* . . . at 20 nm±10% or more, performance will drop because TM loss will increase and insertion losses will increase.

Therefore, by forming the metallic film layer of this invention so that the film thickness is within the range from 5 to 20 nm with variation of film thickness within the range of ±10%, making it very thin and flat, it is possible to suppress reflective scattering of the input beam and prevent light loss, and to keep the TM loss low and the TE loss high.

Moreover, as described above, it is possible to form a stacked non-reflective portion 6 by adding a separate light-transmissive dielectric layer 5 to the polarizing portion 4 on the light-transmissive substrate 1.

As a concrete example of this, a polarizing function element was produced with the stacked portion integrated with a light-transmissive substrate of silicon crystal (Si). The stacked portion was constituted of dielectric layers of silicon dioxide ($SiO_2$) and polarizing portions of silicon dioxide ($SiO_2$) and silver (Ag), arranged in the order of silicon crystal substrate, dielectric layer, and polarizing portion. In this example, the film thickness (target value) was 20 nm, and the dielectric layer had a film thickness of 220 nm and a thickness of 400 nm.

With a target value of the film thickness of the metallic film layer of 20 nm, a TM loss of about 0.014 dB and a TE loss of about 23.5 dB was obtained. With a film thickness of 22 nm when the film thickness variation was +10%, the TM loss was about 0.017 dB and the TE loss was about 25.0 dB. With a film thickness of 18 nm when the film thickness variation was −10%, the TM loss was about 0.011 dB and the TE loss was about 22.0 dB.

In this example, the performance of the polarizing function element was good, with a low TM loss and a high TE loss. With a metallic film layer thickness of 20 nm a TE loss of 20 dB or greater is preferable, so when the target film thickness is 20 nm and the thickness variation is within the range of ±10%, between 22 nm and 18 nm, a polarizing function element with excellent light-transmissive, polarization and other characteristics can be constituted.

When this polarization element is packaged, as described above, it is assembled so that the optical plane is perpendicular to the beam axis, or at an angle of about 8°. If the film thickness of the metallic film layer 3*a*, 3*b* . . . is 5 nm±10% or less, the perpendicular input beam will have a TM loss of 0.002 dB and a TE loss of 2.5 dB, reducing its function as a polarizer. On the other hand, at an angle of 8° with the film thickness of the metallic film layer 3*a*, 3*b* . . . at 20 nm±10% or more, performance will drop because the TM loss is 0.24 dB, the TE loss is 48 dB, and insertion losses will increase.

Thus, because the polarizing portion is formed with a striped structure having a very thin and flat metallic film layer with a target film thickness within the range from 5 to 20 nm and variation of film thickness within the range of ±10%, it is possible to suppress reflective scattering of the input beam and prevent light loss, and to keep the TM loss low and the TE loss high. At the same time, it is possible to constitute a polarizing function element with excellent light-transmissivity and polarization characteristics because the polarizing portion and the stacked portion form a polarizing/non-reflective film.

Now, it is possible to use silicon crystal, lead glass, germanium crystal or lithium niobate crystal for the light-transmissive substrate 1 instead of transparent glass. Such material as $SiO_2$, $TiO_2$, $Al_2O_3$, $Ta_2O_5$ or $ZrO_2$ can be used as the dielectric layer material of the dielectric layer 2*a*, 2*b* . . . . And a general and relatively inexpensive metal such as tantalum, silver, copper or aluminum can be used for the metallic film layer 3*a*, 3*b* . . . .

Figure 3:
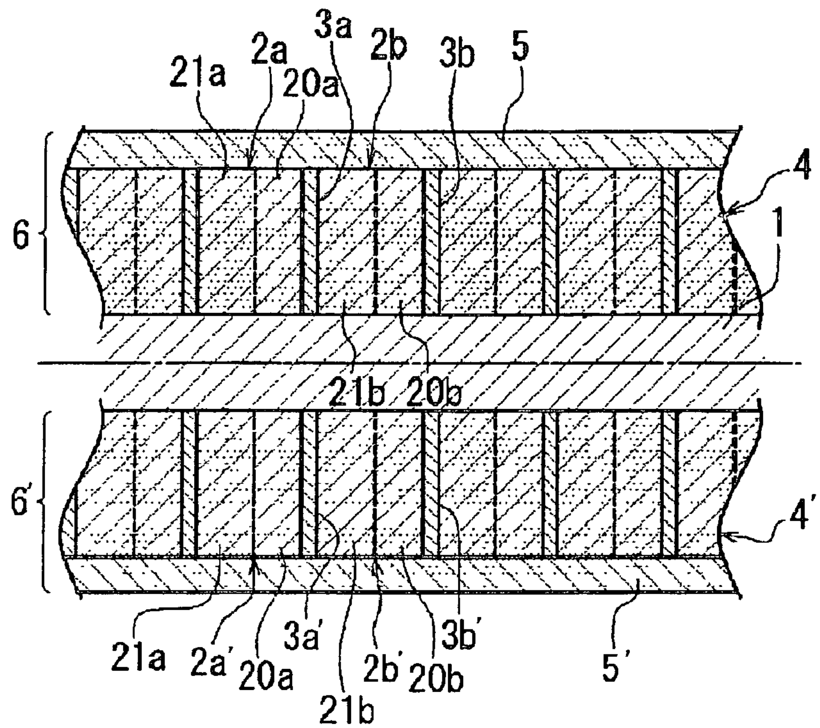
FIG. 3 is an explanatory drawing showing another mode of implementation of this invention.

The mode of implementation described above was explained with a flat polarizing portion 4 or stacked portion 6 on one side of a light-transmissive substrate 1, but a constitution using both sides of the light-transmissive substrate 1 is also possible, as shown in FIG. 3. That is, the light-transmissive substrate 1 is sandwiched between metallic film layers 3*a*, 3*b* . . . and 3*a*', 3*b*' . . . of polarizing portions 4, 4', all parallel to one another.

A concrete example of this has a light-transmissive substrate 1 of silicon (Si), and flat polarizing portions 4, 4' that consist of dielectric layers 2*a*, 2*b* . . . , 2*a*', 2*b*'. . . of silicon dioxide ($SiO_2$) filling the intervals between metallic film layers 3*a*, 3*b* . . . , 3*a*', 3*b*'. . . of tantalum (Ta). The polarizing portions 4, 4' are overlaid with dielectric layers 5, 5' of magnesium fluoride ($MgF_2$) to form stacked non-reflective portions 6, 6' as a polarizing/non-reflective film.

In this case, used with a wavelength of 1.55 μm, the film thickness of the tantalum metallic film layers 3*a*, 3*b* . . . , 3*a*', 3*b*' . . . is 120 nm, the film thickness of the silicon dioxide dielectric layers 2*a*, 2*b* . . . , 2*a*', 2*b*' . . . is 100 nm, the thickness of the polarizing portions 4, 4' is 180 nm, and the thickness of the magnesium fluoride dielectric layers 5, 5' is 290 nm. The index of refraction of the silicon substrate 1 is 3.5, the index of refraction of the polarizing portions 4, 4' is 2.2, the index of refraction of the magnesium fluoride dielectric layers 5, 5' is 1.38, and the polarization/extinction ratio is 48 dB.

In a polarizing function element constituted in this way, the performance as a polarizing function element is improved over that with the polarizing/non-reflective film on both sides of the light-transmissive substrate 1, and the polarization/extinction ratio is greatly increased.

The polarizing function elements constituted as described above can also be constituted with a Faraday rotator as the light-transmissive substrate. Those constituted with transparent glass or silicon as the light-transmissive substrate are used primarily as polarization filters, but with a Faraday rotator as the substrate, the polarizer integrated with a Faraday rotator can be used for incorporation in an optical isolator.

Figure 4:
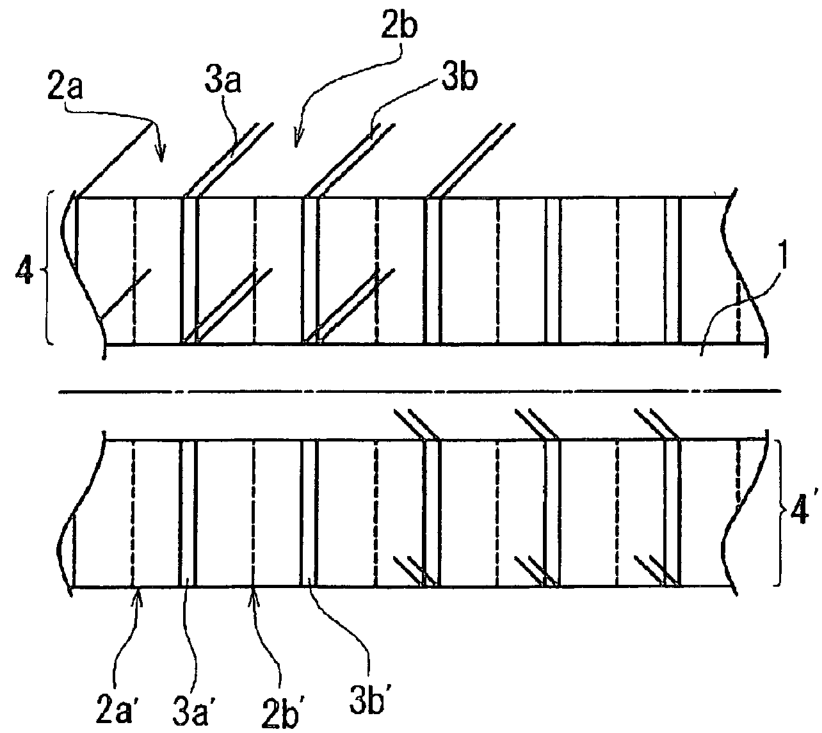
FIG. 4 is an explanatory drawing showing the inclined angles of the polarizing portions on the two sides of one mode of implementation of this invention.

In this extinction, the Faraday rotator serves as the light-transmissive substrate 1, on each side of which is a flat polarizing portion with dielectric layers filling in the intervals between multiple parallel metallic film layers. Another dielectric layer overlays each polarizing portion to form the stacked portion as a polarizing/non-reflective film. In this example, as shown in FIG. 4, the metallic film layers 3*a*, 3*b* . . . , 3*a*', 3*b*' . . . of the polarizing portions 4, 4' on the two sides of the Faraday rotator 1 are inclined at angles to the Faraday rotation angle.

As a concrete example, a Faraday rotator 1 of TbBiFe garnet is used as the substrate, and flat polarizing portions are formed of silver (Ag) metallic film layers and silicon dioxide ($SiO_2$) dielectric layers that fill in the intervals between the metallic film layers. The film of the polarizing portion is overlaid with a layer of magnesium fluoride ($MgF_2$) to form the stacked portion.

Stacked portions can be placed on both sides of the Faraday rotator 1 with the striped structure of the polarizing portion inclined at an angle of about 45° to the Faraday rotation angle.

In this case, when the wavelength in question is 1.55 μm, the thickness of the Faraday rotator 1 (for a 45° rotation) is 470 μm, the film thickness of the silver metallic film layer is 50 nm, the film thickness of the silicon dioxide dielectric layer is 50 nm, the thickness of the polarizing portion is 200 nm, and the thickness of the magnesium fluoride dielectric layer is 350 nm. The index of refraction of the Faraday rotator is 2.35, the index of refraction of the polarizing portion is 2.05, the index of refraction of the dielectric layer is 1.38, and the isolator performance is 42 dB.

When the wavelength in question is 1.31 μm, the thickness of the Faraday rotator 1 (for a 45° rotation) is 400 μm, the film thickness of the silver metallic film layer is 50 nm, the film thickness of the silicon dioxide dielectric layer is 50 nm, the thickness of the polarizing portion is 190 nm, and the thickness of the magnesium fluoride dielectric layer is 330 nm. The index of refraction of the Faraday rotator is 2.35, the index of refraction of the polarizing portion is 2.05, the index of refraction of the dielectric layer is 1.38, and the isolator performance is 41 dB.

With a polarizing function element constituted in this way, the polarizing/non-reflective film on both sides has a polarization function and also functions to heighten light transmissivity, so that it can be used as a integrated polarizer and Faraday rotator with low light loss and excellent characteristics.

Figure 5:
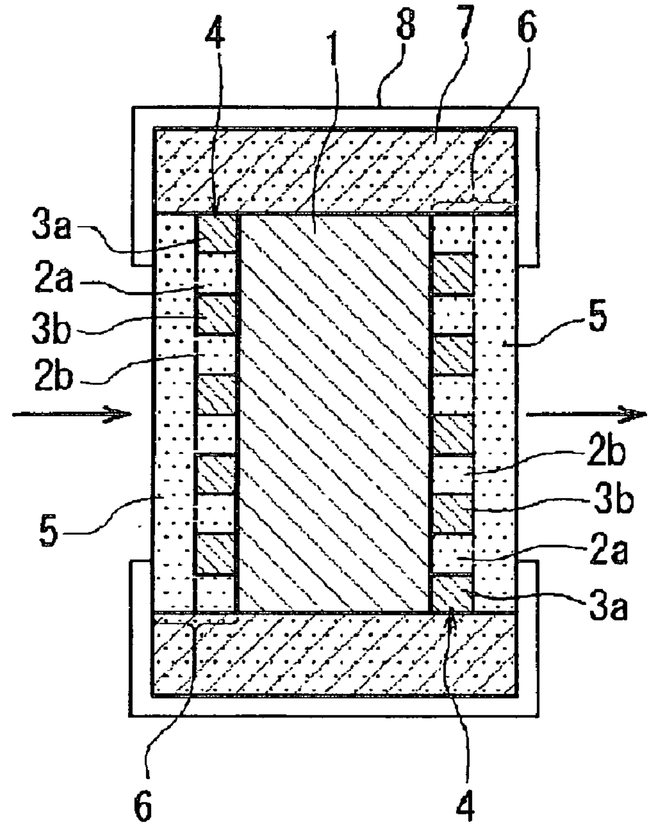
FIG. 5 is an explanatory drawing showing the optical isolator of this invention.

An optical isolator in which this polarizing function element is incorporated also has, as shown in FIG. 5, a cylindrical magnet 7 and a stainless steel holder 8. The polarizing function element with a polarizing/non-reflective film on both sides of a Faraday rotator is fitted inside the magnet 7, and everything including the magnet 7 is assembled into the holder 8 to constitute an inexpensive and compact optical isolator with high performance and excellent characteristics.

Now, the Faraday rotator used as the light-transmissive substrate can be a magnetically saturated Faraday rotator with no external magnetic domain, such as a Tb—Bi—Fe—Ga—Al—O substrate of hardened magnetic garnet (see JPO Kokai Patent Report H9-328398 of 1997).

An optical isolator that incorporates a polarizing function element with this magnetically saturated Faraday rotator with no external magnetic domain as the light-transmissive substrate does not require a magnet, and so can be even more inexpensive and compact.

Figure 6:
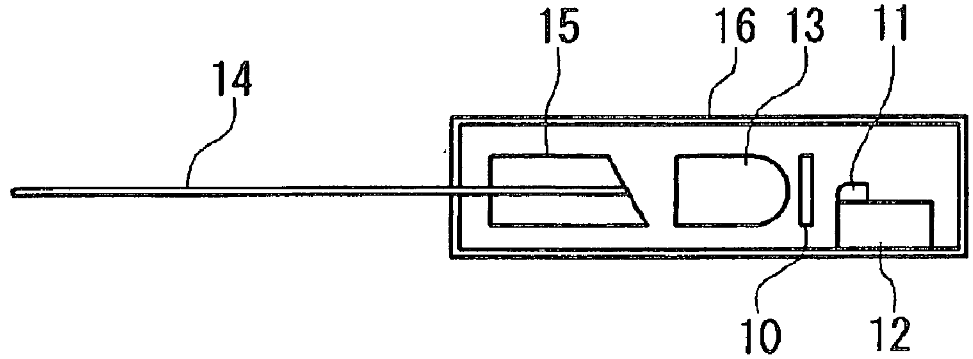
FIG. 6 is an explanatory drawing showing the laser diode module of this invention.
Figure 7A:
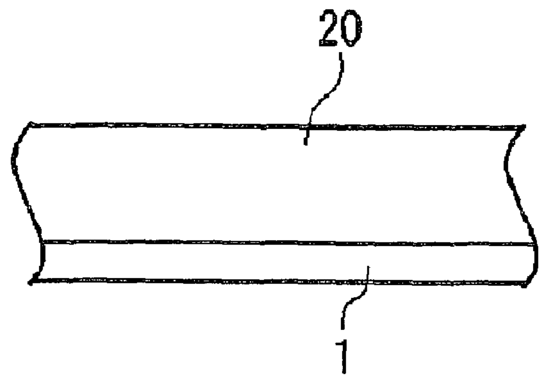
FIG. 7 is an explanatory drawing showing the process of manufacturing the polarizing function element of this invention, in which (a) is the process of forming the base layer, (b) is the process of forming the base lattice, (c) is the process of forming the metallic film layer, (d) is the process of filling dielectric material into the residual intervals between the base lattice and the metallic film layer, and (e) is the process of removing excessive dielectric material and metallic film layer.
Figure 7B:
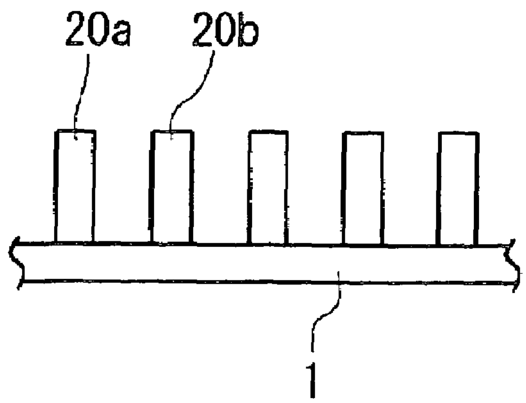
Figure 7C:
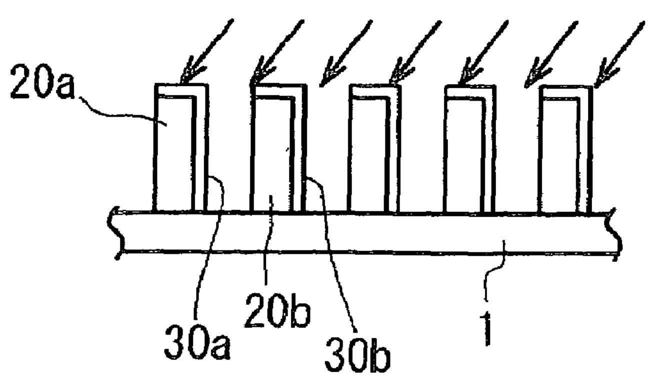
Figure 7D:
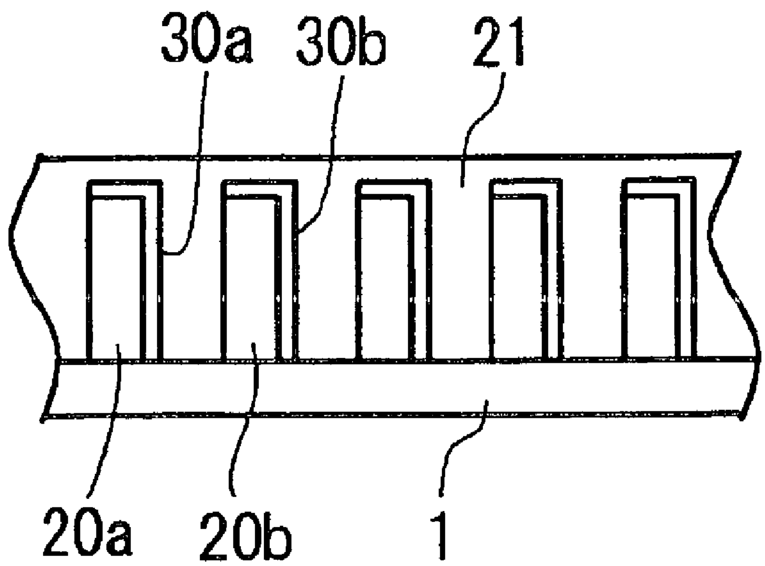
Figure 7E:
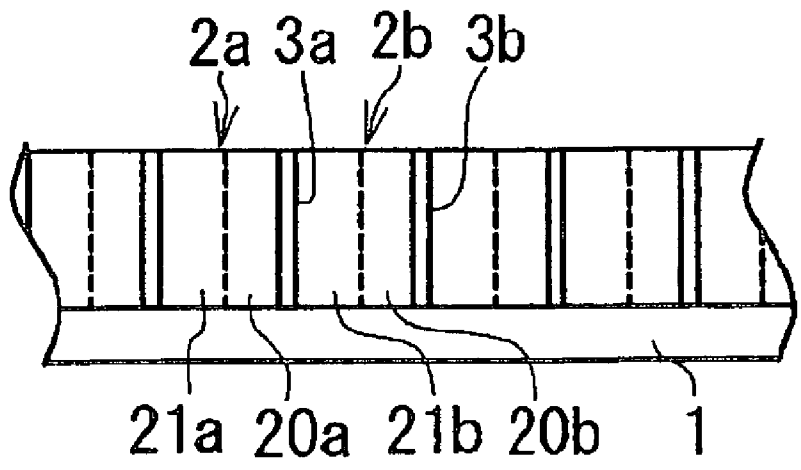

It is possible to constitute a laser diode module, as shown in FIG. 6, with any of the optical isolator modes described above. This laser diode module has, in addition to the optical isolator 10, a semiconductor laser chip 11 used as a light source, a heat sink 12 for the semiconductor laser chip 11, a cylindrical lens 13 to focus the laser beam emitted by the semiconductor laser chip 11, an optical fiber 14, a ferrule 15 of zirconia that is fixed to the optical fiber 14, and a module case 16.

With a laser diode module constituted in this way, the oscillation power is greater, relative to the electrical input, and more stable than that using an optical isolator with a conventional polarizing film.

To measure its performance, a comparison study of isolation and transmission loss characteristics using ten each of optical isolators of this invention for wavelengths of 1.55 μm (Nr. 1) and 1.31 μm (Nr. 2) and, for comparison, conventional optical isolators (see JPO Kokai Patent Report H7-49468 of 1995) for wavelengths of 1.55 μm (Nr. 3) and 1.31 μm (Nr. 4). The results are as shown in table 1, confirming the superiority of this invention over the prior art.

TABLE 1

| Test Sample | Isolation (dB) | Transmission Loss (dB) |
|---|---|---|
| This Invention (Nr. 1) | 40 to 42 | 0.2 to 0.3 |
| This Invention (Nr. 2) | 38 to 41 | 0.3 to 0.5 |
| Prior Art (Nr. 3) | 30 to 35 | 2.0 to 2.2 |
| Prior Art (Nr. 4) | 29 to 33 | 1.9 to 2.1 |

Thus, because the polarizing portion 4 or the stacked portion formed on the light-transmissive substrate, the film itself has a firmly integrated structure, and so it is possible to obtain excellent performance as a polarizing function element.

When a light-transmissive substrate other than a Faraday rotator is used, the polarizing function element can be used together with a Faraday rotator as an optical isolator with excellent characteristics.

Now, BK-7 glass, silicon crystal, and Faraday rotator crystal garnet or magnetically saturated hardened magnetic garnet with no external magnetic domain have been indicated for the light-transmissive substrate in the modes of implementation described above, but other varieties of substrate can be used. Other possibilities include lead glass, germanium crystal, lithium niobate crystal, and cadmium, manganese, mercury or tellurium Faraday rotator instead of garnet.

When manufacturing the polarizing function element of this invention, a base layer 20 of dielectric material is first formed on the surface of the light-transmissive substrate 1, by sputtering or vacuum deposition, in order to form a dielectric layer of the specified thickness (see FIG. 7(*a*)). Next a striped mask is placed on the surface of the base layer 20, and a base lattice 20*a*, 20*b* . . . of multiple parallel segments separated by a specified interval is formed by X-ray lithography, ECR or etching (see FIG. 7(*b*)).

Using molecular beam epitaxy (MBE), atomic layer epitaxy (ALE), sputtering or vacuum deposition to apply a metal at an angle from above to the base lattice 20*a*, 20*b* . . . , a thin metallic film layer 30*a*, 30*b* . . . is formed (see FIG. 7(*c*). Because this metal is applied at an angle from above to one side of the base lattice 20*a*, 20*b* . . . , a thin and very flat metallic film layer 30*a*, 30*b* . . . is formed. The metal may adhere to the top of the base lattice 20*a*, 20*b* . . . as well, but this can be removed in subsequent processing.

After this metallic film layer 30*a*, 30*b* . . . is formed, dielectric material 21 of the same type as used for the base lattice 20*a*, 20*b* . . . is applied by sputtering or vacuum deposition to fill in the remaining intervals 21*a*, 21*b* . . . between the metallic film layers 30*a*, 30*b* . . . and the base lattice 20*a*, 20*b* . . . (see FIG. 7(*d*)). Next, the excess dielectric material 21 and metallic film layer 30*a*, 30*b* . . . is ground away to the point of exposing the top surfaces of the base lattice 20*a*, 20*b* . . . (see FIG. 7(*e*)).

In this way, a dielectric lattice 2*a*, 2*b* . . . is created by filling in the remaining intervals 21*a*, 21*b* . . . between the metallic film layers 30*a*, 30*b* . . . and the base lattice 20*a*, 20*b* . . . with dielectric material 21. In other words, the dielectric lattice 2*a*, 2*b* . . . and the metallic film layer 3*a*, 3*b* . . . make up the polarizing portion 4 with a striped structure that is the fundamental component of this invention.

It is also possible to form a stacked portion by overlaying the polarizing portion 4 with a dielectric layer 5 using the same method used to form the base layer. The dielectric layer can be overlaid with a dielectric layer of $TiO_2/SiO_2$ or $Ta_2O_5/SiO_2$. Such a constitution further enhances the function of preventing reflection.

When the polarizing portion and stacked portion made in this way is desired on both sides of the light-transmissive substrate, the processes described above can be repeated on the other side.

Using the processes described above, it is possible to form the metallic film layer 3*a*, 3*b* . . . as a thin and flat film with a target thickness in the range from 5 to 20 nm and variation of thickness within the range of ±10%. In this case, the film thickness of the dielectric layer 2*a*, 2*b* . . . can be made from 50 to 300 nm, and the thickness of the polarizing portion can be made from 200 to 1000 nm.

In terms of process, the base lattice 20*a*, 20*b* . . . can be formed to a specified height by applying the X-ray lithography, ECR or etching methods, and the metallic film layer 3*a*, 3*b* . . . can be formed by such methods as molecular beam epitaxy (MBE), atomic layer epitaxy (ALE), sputtering, vacuum deposition and so the polarizing function element can be fabricated inexpensively by simple processes.

Figure 8:
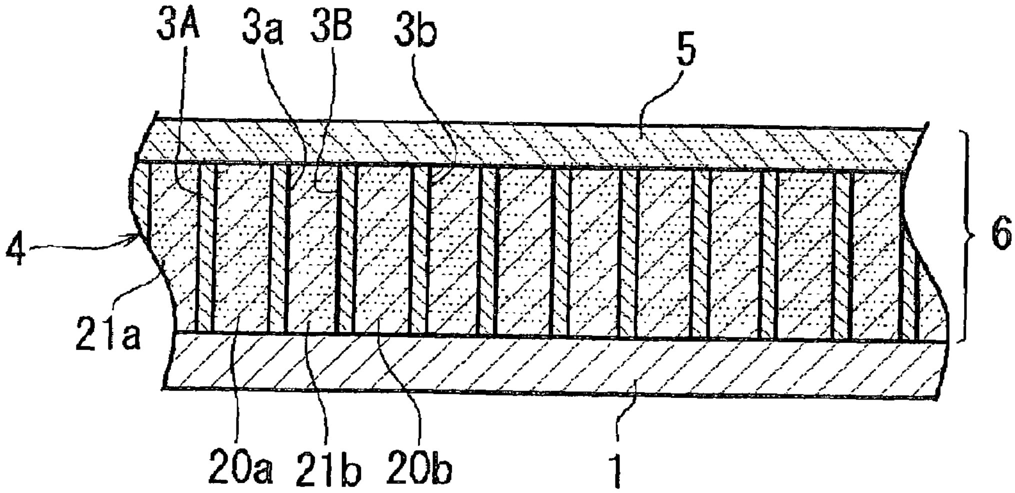
FIG. 8 is an explanatory drawing showing the metallic film layer on both sides of the base lattice.

Now, this mode of implementation has been explained with the metallic film layer 3*a*, 3*b* . . . formed on one side of the base lattice 20*a*, 20*b* . . . But as shown in FIG. 8, it is possible to apply metallic film layers 3*a*, 3*b* . . . , 3A, 3B . . . to both sides of the base lattice 20*a*, 20*b* . . . . In this case, the conductive metal from the vapor deposition source should be made to travel toward one side in a direction different from the direction of travel to the other side.

Further, the polarizing function of this invention has been explained with examples that use silicon crystal as the light-transmissive substrate, but the same manufacturing processes can be applied when a Faraday rotator with a TbFBiFe garnet or other garnet structure is used as the light-transmissive substrate.

The same is true when magnetically saturated hardened magnetic garnet with no external magnetic domain or cadmium, manganese, mercury or tellurium is used instead of garnet as the light-transmissive substrate.

The terms and expressions used above in the specification of this invention are used only for explanation and in no way limit the content of the invention. The use of limiting terms and expressions is not intended to exclude anything equivalent to the mode of the invention described above, or any part thereof. It is clear, therefore, that various changes are possible within the scope of this invention for which rights are claimed.

POTENTIAL FOR INDUSTRIAL USE

As stated above, this invention has the polarizing function of polarizing an input beam and a non-reflecting function of suppressing reflection of the input beam, wherein at least one side of a light-transmissive substrate has a polarizing portion with a striped structure formed by multiple alternating light-transmissive dielectric layers and metallic film layers. In this way the polarizing portion is both the polarizing and the non-reflective film and is integrated with the light transmissive substrate so that it is possible for the polarizing function element to be manufactured simply and easily and to have high excellent characteristics. It is also possible for the polarizing function element to be constructed inexpensively and miniaturization. By forming the polarizing portion, with a striped structure, on the light transmissive substrate in this way, it is possible to have the polarizing and non-reflective film and the substrate in a strong, integrated structure, and to have superior performance including light-transmissivity and polarization.

It is also possible to improve the performance as a polarization element and increase the polarization/extinction ratio by forming a polarizing portion or stacked portion on both sides of the light-transmissive substrate.

It is preferable that the metallic film layers be very thin and flat, having a target film thickness within the range from 5 to 20 nm and variation of film thickness within the range of ±10%. By constituting the metallic film layers in this way, it is possible to suppress reflective scattering of the input beam by the metallic film layers and maintain low TM loss and high TE loss.

The polarizing portion can have one or more stack portions in which light-transmissive dielectric layers are stacked. By stacking light-transmissive dielectric layers in this way, it is possible to improve the function of preventing reflection.

With this invention, it is possible to use a Faraday rotator as the light-transmissive substrate. With such a constitution, it is possible to form a Faraday rotator integrated with a polarizing function element that has low light loss and excellent performance.

It is also possible to have an optical isolator that incorporates a polarizing function element with a Faraday rotator as the light-transmissive substrate, and a laser diode module in which such an isolator is mounted. This optical isolator has high performance and excellent characteristics and can be manufactured simply and easily. The laser diode module in which such an isolator is mounted will have a greater oscillation power for the same electrical input.

This invention has the metallic film layer formed by vapor deposition at an angle on one side of the base lattice so that it is possible to form the polarizing portion reliably to suppress reflective scattering of the input beam and to have low light loss. It is also possible to manufacture the polarizing function element with superior performance including light-transmissivity and polarization easily and inexpensively.

A method of manufacturing in which the metallic film layer is deposited on both sides of the base lattice at angles that are different on each side of the base lattice is also possible. Using this it is possible to produce the polarizing portion that suppresses reflective scattering of the input beam simply and that has low light loss and with good efficiency.

A method of manufacturing in which a polarizing portion with a striped structure of dielectric layers and metallic film layers, which are very thin and flat having a target film thickness within the range from 5 to 20 nm and variation of film thickness within the range of ±10%, integrated with the substrate, is also possible. By using this method, it is possible to suppress reflective scattering of the input beam by the metallic film layers and maintain low TM loss and high TE loss.

What is claimed is:

1. A polarizing function element that has the polarizing function of polarizing an input beam and a non-reflecting function of suppressing reflection of the input beam, in which at least one side of a light-transmissive substrate has a polarizing portion with a striped structure formed by multiple alternating light-transmissive dielectric layers and metallic film layers;

wherein the metallic film layers are thin and flat, having a target film thickness within the range from 5 to 20 nm and variation of film thickness within the range of ±10%, and a Faraday rotator is used as the light-transmissive substrate.

2. A polarizing function element of claim 1, wherein the polarizing portion is formed with a thickness of substantially ¼λ, where λ is a wavelength of the input beam.

3. An optical isolator incorporating a polarizing function element having the polarizing function of polarizing an input beam and a non-reflecting function of suppressing reflection of the input beam, in which at least one side of a light-transmissive substrate has a polarizing portion with a striped structure formed by multiple alternating light-transmissive dielectric layers and metallic film layers;

wherein the metallic film layers are thin and flat, having a target film thickness within the range from 5 to 20 nm and variation of film thickness within the range of ±10%, and a Faraday rotator is used as the light-transmissive substrate.

4. An optical isolator of claim 3, wherein the polarizing portion is formed with a thickness of substantially ¼λ, where λ is a wavelength of the input beam.

5. A laser diode module in which is mounted an optical isolator incorporating a polarizing function element having the polarizing function of polarizing an input beam and a non-reflecting function of suppressing reflection of the input beam, in which at least one side of a light-transmissive substrate has a polarizing portion with a striped structure formed by multiple alternating light-transmissive dielectric layers and metallic film layers;

wherein the metallic film layers are thin and flat, having a target film thickness within the range from 5 to 20 nm and variation of film thickness within the range of ±10%, and a Faraday rotator is used as the light-transmissive substrate.

6. A laser diode module of claim 5, wherein the polarizing portion is formed with a thickness of substantially ¼λ, where λ is a wavelength of the input beam.

7. A method of manufacturing a polarizing function element, comprising the steps of:

providing a light-transmissive substrate, forming a base layer of a specified thickness on the light-transmissive substrate to form a light-transmissive dielectric layer;

forming multiple parallel parts of a base lattice of the base layer separated by a given interval on the light-transmissive substrate;

forming a metallic film layer, by vapor deposition at an angle on each side of the base lattice to form a metal plated base lattice; and filling in remaining intervals between the metallic film layer and the base lattice with dielectric material to form a striped structure, wherein dielectric layers and metallic film layers are arranged in a striped structure, with the light transmissive substrate so that the striped structure of the light-transmissive substrate polarizes an input beam and suppresses reflection of the input beam.

8. A method of manufacturing a polarizing function element as described in claim 7, wherein the metallic film layer is deposited on each side of the base lattice at angles that are different from one another.

9. A method of manufacturing a polarizing function element as described in claim 7 or 8, wherein a polarizing portion of the polarizing function element includes a striped structure of dielectric layers and metallic film layers, which are thin and flat having a target film thickness within the range from 5 to 15 nm and variation of film thickness within the range of ±10%.

10. A method of manufacturing a polarizing function element of claim 7, wherein the polarizing portion is formed with a thickness of substantially ¼λ, where λ is a wavelength of the input beam.

11. A polarizing function element, comprising:

a light-transmissive substrate; and a polarizing portion having flat shape with a specified constant thickness, formed by multiple alternating light-transmissive dielectric layers and metallic film layers integrally formed with one another to form a striped structure, wherein the striped structure polarizes an input beam and suppresses reflection of the input beam, and wherein at least one side of said light-transmissive substrate has said polarizing portion integrated therewith in such manner that the striped structure comprises the layers of the light-transmissive dielectric layers and metallic film layers alternating laterally across the light-transmissive substrate and the polarizing portion is integrated with the light-transmissive substrate.

12. A polarizing function element as described in claim 11, wherein said polarizing portion is formed with a thickness of substantially 390 nm so as to function effectively as the polarizing/non-reflective film.

13. A polarizing function element of claim 11, wherein a total thickness of the polarizing portion formed is substantially ¼λ, where λ is a wavelength of the input beam.

14. A polarizing function element, comprising:

a light-transmissive substrate;

a polarizing portion having flat shape with a specified constant thickness, formed by multiple alternating light-transmissive dielectric layers and metallic film layers integrally formed with one another to form a striped structure, wherein the striped structure polarizes an input beam and suppresses reflection of the input beam, wherein at least one side of said light-transmissive substrate has said polarizing portion integrated therewith in such manner that the striped structure comprises the layers of the light-transmissive dielectric layers and metallic film layers alternating laterally across the light-transmissive substrate and the polarizing portion functions as a polarizing/non-reflective film integrated with the light-transmissive substrate, and a separate light-transmissive dielectric layer is added to the polarizing portion to form a stacked portion that functions as a polarizing/non-reflective film.

15. A polarizing function element as described in claim 14, wherein said stacked portion comprises multiple layers with dielectric layers alternating with polarizing portions.

16. A method of manufacturing a polarizing function element, comprising the steps of:

providing a light-transmissive substrate, formins a base layer of a specified thickness on the light-transmissive substrate to form a light-transmissive dielectric layer;

forming multiple parallel parts of a base lattice of the base layer separated by a given interval on the light-transmissive sublstrate;

forming a metallic film layer, by vapor depostion at an angle on each side of the base lattice to form a metal plated base lattice; and filling in remaining intervals between the metallic film layer and the base lattice with dielectric material to form striped structure wherein dielectric layers and metallic film layers are arranged in a spriped structure, with the light transmissive substrate so that the striped structure of the light-transmissive substrate polarizes an input beam and suppresses reflection of the input beam.

17. A polarizing function element, comprising:

a light-transmissive substrate;

a polarizing portion having flat shape with a specified constant thickness, formed by multiple alternating light-transmissive dielectric layers and metallic film layers integrally formed with one another to form a striped structure, wherein the striped structure polarizes an input beam and suppresses reflection of the input beam, wherein both sides of said light-transmissive substrate have said polarizing portion integrated therewith respectively in such manner that each striped structure comprises the layers of the light-transmissive dielectric layers and metallic film layers alternating laterally across the light-transmissive substrate and each polarizing portion functions as a polarizing/non-reflective film integrated with the light-transmissive substrate.

18. A polarizing function element of claim 15, wherein the polarizing portions are formed with a combined total thickness of substantially ¼λ, where λ is a wavelength of the input beam.

19. A polarizing function element of claim 17, wherein the polarizing portions formed on both sides of said light transmissive substrate have a combined total thickness of substantially ¼λ, where λ is a wavelength of the input beam.

* * * * *